(12) United States Patent
Mark

(10) Patent No.: US 7,765,286 B2
(45) Date of Patent: Jul. 27, 2010

(54) METHOD AND APPARATUS FOR MANAGING ASSETS WITHIN A DATACENTER

(75) Inventor: Larry Edward Mark, Sunningdale (GB)

(73) Assignee: Nlyte Software Limited, London (GB)

( * ) Notice: Subject to any disclaimer, the term of this patent is extended or adjusted under 35 U.S.C. 154(b) by 1736 days.

(21) Appl. No.: 10/818,959

(22) Filed: Apr. 6, 2004

(65) Prior Publication Data

US 2006/0085242 A1 Apr. 20, 2006

(30) Foreign Application Priority Data

Feb. 19, 2004 (GB) ................................. 0403654.7

(51) Int. Cl.
*G06F 15/16* (2006.01)
*G06F 15/173* (2006.01)
*G06F 15/177* (2006.01)

(52) U.S. Cl. ....................... 709/223; 709/226; 717/101; 705/28; 705/35; 711/114

(58) Field of Classification Search .................. 709/223
See application file for complete search history.

(56) References Cited

U.S. PATENT DOCUMENTS

| | | | | |
|---|---|---|---|---|
| 6,349,238 B1 * | 2/2002 | Gabbita et al. | ............... | 700/101 |
| 6,985,779 B2 * | 1/2006 | Hsiung et al. | .................. | 700/19 |
| 6,996,538 B2 * | 2/2006 | Lucas | ........................... | 705/28 |
| 7,139,999 B2 * | 11/2006 | Bowman-Amuah | ......... | 717/101 |
| 7,313,534 B2 * | 12/2007 | Scheer | ........................... | 705/9 |
| 2002/0032626 A1 * | 3/2002 | DeWolf et al. | ................. | 705/35 |
| 2002/0040313 A1 | 4/2002 | Hunter et al. | | |
| 2002/0091699 A1 * | 7/2002 | Norton et al. | .................. | 707/10 |
| 2003/0014332 A1 | 1/2003 | Gramling | | |
| 2003/0204597 A1 * | 10/2003 | Arakawa et al. | ............ | 709/226 |
| 2003/0225650 A1 * | 12/2003 | Wilson et al. | .................. | 705/36 |
| 2003/0233287 A1 | 12/2003 | Sadler et al. | | |
| 2004/0099736 A1 * | 5/2004 | Neumark | ...................... | 235/385 |
| 2004/0158507 A1 * | 8/2004 | Meek et al. | .................... | 705/28 |
| 2005/0021710 A1 * | 1/2005 | Johnson et al. | ............. | 709/223 |
| 2005/0050272 A1 * | 3/2005 | Behrens et al. | ............. | 711/114 |
| 2005/0222933 A1 * | 10/2005 | Wesby | .......................... | 705/36 |

FOREIGN PATENT DOCUMENTS

WO WO03/065270 A2 8/2003

* cited by examiner

*Primary Examiner*—Haresh N Patel
(74) *Attorney, Agent, or Firm*—Haynes and Boone, LLP

(57) ABSTRACT

An asset management system comprising data storage means capable of storing data and arranged to store asset data relating to a plurality of assets and datacenter data relating to at least one datacenter comprising at least one element, processing means capable of processing data and generating an output, the processing means being arranged to process the asset data and the datacenter data and generate an output comprising an acceptable location for each of said assets within at least one datacenter based upon a comparison of at least one asset parameter associated with the asset and at least one element of the datacenter, the system further comprising display means capable of displaying the output, the display means being arranged to display the acceptable location to a user of the system.

40 Claims, 10 Drawing Sheets

METHOD AND APPARATUS FOR MANAGING ASSETS WITHIN A DATACENTER

FIELD OF INVENTION

This invention relates to an asset management system and method. More particularly but not exclusively, it relates to an asset management system and method for managing assets, typically computer equipment, within a datacenter.

BACKGROUND OF THE INVENTION

Datacenters in which a large volume of data is stored in arrays of servers, secured and routed present any number of particular problems for asset management, such as managing network connectivity and balancing the assets within the datacenter in relation to heat dissipation and power consumption. Localised hotspots within the datacenter can lead to degraded performance of servers and also server failure. Similarly, localised high power consumption can lead to overloading of the datacenter's power supply network, resulting in server down time.

These problems become more pronounced where there are a number of different workgroups operating within one datacenter, for example in an outsourced datacenter where multiple third party organisations store their data. Each workgroup will have both common and client specific aims. This leads to a situation where there is no overall strategy, or centralised management technique, in place to ensure the smooth and synergistic operation of the datacenter.

The above mentioned problems demonstrate that there are a number of interrelated factors that need to be monitored and ideally optimised in order to maintain the reliable operation and longevity of data centre assets.

No prior solutions to these problems have been provided and simple tools such as network discovery tools were all that was provided in order to try and determine the contents of a datacenter.

The lack of tracking of assets within a datacenter and the autonomy of workgroups leads to a situation where the location of a particular asset, e.g. a server, is not known. Also, cabinet space is not actively managed, which in combination with the lack of tracking of assets leads to space within cabinets of the datacenter being assigned on the basis of arbitrary, or semi-arbitrary, decisions rather than attempting to optimise the use of cabinet space, and the distribution of heat load and power consumption.

SUMMARY OF INVENTION

According to a first aspect of the present invention there is provided an asset management system comprising data storage means arranged to store asset data relating to a plurality of assets, processing means arranged to process the asset data, and display means, the processing means being arranged to process the asset data so as to determine an acceptable location for an asset within a datacenter based upon a comparison of at least one asset parameter associated with the asset and at least one complementary element parameter associated with an element of the datacenter, the display means being arranged to output the acceptable location to a user of the system.

Such a system allows a user to have assets, typically servers, allocated within a datacenter in a manner that is not random and may be used to manage such parameters as heat dissipation, power loading and network connectivity to increase the performance of the assets over the situation where they are randomly allocated within the datacenter.

Such a system has the technical advantage that it may help to reduce the failure rate of assets managed by the system. The reduction of the failure rate may be due to an increased life of an asset (for example because it has not been placed in too hot an environment) or alternatively, or additionally, be due to fewer failures of an element (for example fewer power outages because there is less chance of a power supply being overloaded). Further technical advantages may include the reduced likelihood of errors in the placement of the assets.

The system may comprise input means arranged to receive a user input accepting a suggested location for the asset.

The processing means may be arranged to update the asset data each time an asset is allocated to a location within the datacenter. The asset data for any given asset may form an audit trail for said asset which can be advantageous because it can allow faults, other problems and the like to be traced.

Thus, an asset can be tracked within a data centre and its usage history accessed from the its associated asset data. This means, for example, that if a particular asset is consistently seen to fail it can be replaced rather than instigating a wholesale replacement of all assets of that type in a data centre.

The asset parameters may comprise any one, or combination, of the following: dimension (including height, width and/or depth) of asset, power consumption, heat dissipation, number and/or type of network connectivity, reliability. The element parameter may comprise any one, or combination, of the following: available space, power supply availability, ability to dissipate heat, number and/or type of network connections, required reliability.

The processing means may be arranged to process workflow data, typically stored on the data storage means, indicative of a series of operations to be carried out in relation to at least one of the assets. The processing means may be arranged to define a critical path from the operations of actions to be performed. The processing means may be arranged to open a second operation in the critical path once a first operation has been closed. The processing means may be arranged to receive comment data associated with an operation from a user input and to store the comment data in association with the workflow data for said operation.

Thus, the workflow of different parties operating within the datacenter can be managed and tracked in relation to each asset contained within the datacenter.

The processing means may be arranged to access recovery data from the, or a further, data storage means in response to an input that a failure of a system, or asset, of the datacenter has occurred. The recovery data may comprise contact details of people to be contacted upon failure of the system, or asset. The processing means may be arranged to generate messages to be issued to the people listed in the recovery data in the form of any one, or combination, of the following: e-mail, short messaging service (SMS), multimedia messaging service (MMS), any other suitable format. The processing means may be arranged to initiate a conference call between the people listed in the recovery data. The processing device may be arranged to generate a report data relating to at least one, or more, of the following: nature of the failure, identity of the system, or asset, subject to the failure, details of communications sent to people named in the recovery data.

This allows the rapid and automated contact of the appropriate principals in the event of a failure of a system, or asset, of the datacenter thereby speeding up the restoration of the datacenter to a working condition and reducing downtime of the system, or asset, that has failed.

The asset may comprise a server, a peripheral, network equipment, a power strip, a cabinet or any other suitable datacenter asset.

The element of the datacenter may comprise a cabinet.

The display means may be arranged to output a representation of the datacenter, generally a graphical user interface (GUI) representation of the datacenter, which may identify each element and/or asset within the datacenter. The display means may further be arranged to output a graphical user interface (GUI) representation of either, or both, of the element of the datacenter or/and the asset, either, or both of which, may be manipulated about the display means by means of a 'click and drag' of a mouse or other input device by a user.

In some embodiments the system may be arranged to cause the display to display a browser (such as Microsoft™ Explorer™ or Netscape™ Navigator™). Such an arrangement is convenient as it provides a display that is familiar to users and as such may be easier to use than other approaches.

The use of GUI's enhances user appeal. GUI's also increases the ease of use of the system over alphanumeric inputs and thereby reduce the skill level required to operate such a system effectively. The skilled person will appreciate that a GUI is intended to cover any system in which a user can manipulate a pointer on the screen using an input device whose movement is reflected by movement of the pointer on the screen.

The data storage means may be remote from the processing means and either or both of the data storage means and the processing means may be remote from the display means.

The system may be arranged to manage the assets of a plurality of datacenters.

According to a second aspect of the present invention there is provided an electronic signal processing device arranged to act as the processing means of the first aspect of the present invention.

The signal processing device may be a PC or other computer.

According to a third aspect of the present invention there is provided a method of asset management comprising the steps of:

i) storing asset data relating to a plurality of assets upon a data storage means;
ii) processing the asset data so as to determine an acceptable location for an asset within a datacenter based upon a comparison of at least one asset parameter associated with the asset and at least one complementary element parameter associated with an element of the datacenter at a processing means;
iii) outputting the acceptable location to a user of the system.

The method may comprise inputting user acceptance of a suggested location for the asset. Thus, the method provides the technical advantage of increasing the accuracy of the asset data and as such should increase the efficiency of managing the datacenter. The method may allow predetermined strategic and/or environmental considerations to be considered when the placement of an asset is being planned.

The method may comprise updating the asset data each time an asset is allocated to a location within the datacenter. The method may comprise forming an audit trail for an asset from the asset data for said asset.

The method may comprise using any one, or combination, of the following asset parameters at step (ii): dimension (including height, depth and/or width) of asset, power consumption, heat dissipation, number and/or type of network connectivity, reliability. The method may comprise using any one, or combination, of the following element parameters at step (ii): available space, power supply availability, ability to dissipate heat, number and/or type of network connections, required reliability.

The method may comprise balancing parameters of the elements across a datacenter managed by the method. Such a method is advantageous because it may help to reduce failures within the datacenter. For example, should power supplies within the datacenter be loaded unevenly there may be an increased likelihood of power outages and in such circumstances it would be advantageous to balance power usage across the datacenter. Similar examples could be given for other element parameters that are balanced by the method.

Such a method is further advantageous because it can help to provide resilience in the event of failure of a resource provided to an element of the datacenter. For example the method may balance assets across power supplies such that should any one power supply fail then other predetermined assets may continue to function. Thus assets, perhaps critical assets, of any one party may be balanced across a plurality of power supplies.

Datacenter resources may comprise any one or more of the following: power supplied to the or each asset and/or element; the heat output by the or each asset and/or element (and/or the cooling required for the or each asset and/or element); a maintenance resource in order to service the or each asset and/or element.

Further, the method may be used to plan the placing of assets according to outputs made by the asset. The outputs taken into consideration may comprise the output of heat, perhaps by vented fluid such as air. Such a method is advantageous because it can help to increase the life of that asset and/or assets neighbouring that asset.

The method may comprise processing workflow data indicative of a series of operations to be carried out in relation to at least one of the assets at the processing means. The method may comprise defining a critical path from the operations. The method may comprise opening a second operation in the critical path once a first operation has been closed. The method may comprise receiving comment data associated with an operation from a user input and to storing the comment data in association with the workflow data for said operation.

Conveniently, the method associates Service Level Agreements (SLA's) with assets. SLA's need not be related to assets but may be associated with any task of a workflow and/or with an overall workflow, for example with workflow associated with a request for a new power feed in a datacenter. Should such SLA's be provided it is convenient to assess workflow data to determine whether the SLA's have been met. Such assessment is advantageous because it can help to ensure parties are meeting contractual requirements placed upon them. The method may allow reports to produced on the workflow data and/or SLA compliance.

The method may comprise accessing recovery data from the, or a further, data storage means in response to an input that a failure of a system, or asset, of the datacenter has occurred. The method may comprise generating messages to be issued to people listed in the recovery data in the form of any one, or combination, of the following: e-mail, short messaging service (SMS), multimedia messaging service (MMS), telephone call, fax transmission, any other suitable format. The method may comprise initiating a conference call between people listed in the recovery data. Accessing recovery data in this manner is advantageous because it can help to reduce the down time of assets therewithin. Such reduction of down time can potentially save significant sums for parties using the managed assets and can also help to prevent the loss of resources associated with those assets.

The method may comprise generating a report data relating to at least one, or more, of the following: nature of the failure, identity of the system, or asset, subject to the failure, details of communications sent to people named in the recovery data.

The report data may additionally, or alternatively, allow reports to be generated on any of the following categories: the fragmentation of assets within the datacenter; the growth rate of asset and/or element parameters; power distribution to assets and/or elements; compliance with SLA's; how assets are split between resources within the datacenter.

The method may comprise providing the asset in the form of a server.

The method may comprise providing the datacenter element in the form of a cabinet.

The method may comprise outputting a representation of the datacenter at a display means, and may further comprise identifying each element and/or asset within the datacenter. There may of course be a plurality of assets and/or elements.

Generally the representation will be provided by a graphical user interface (GUI) so providing a convenient way for a user to interact with the method. The method may comprise outputting a graphical user interface (GUI) representation of either, or both, of the element of the datacenter or/and the asset, either, or both of which, may be manipulated about the display means by means of a 'click and drag' of a mouse, or other input device, by a user.

The method may be arranged to manage a plurality of datacenters.

Conveniently, the method comprises assessing the owner/ user of an assets use of a resource of the data centre and apportions charges for use of the resource to the owner/user. Such a method is convenient because it may allow charges for use of the datacenter to be apportioned more accurately. For example, charges may be apportioned according to the amount of power used by one or more assets; may be according to the amount of heat output by one or more assets; may be according to the amount of maintenance resources required to keep the asset functioning correctly.

The method may provide the status of assets within the datacenter. The status may be reflected as any one of the following (non-exhaustive list) of categories: allocated, reserved, installed. Such a method can help with planning of workflow, etc. within the datacenter.

According to a fourth aspect of the present invention there is provided a data centre comprising an asset management system according to the first aspect of the present invention or, and, a signal processing device according to the second aspect of the present invention or, and, having assets managed according to the third aspect of the present invention.

According to a fifth aspect of the present invention there is provided an asset managed using the asset management system of the first aspect of the present invention or, and, the signal processing device of the second aspect of the present invention or, and, the method of the third aspect of the present invention.

According to a sixth aspect of the present invention there is provided a data storage device readable by a signal processing device carrying a set of instructions which, when executed upon the signal processing device, causes the signal processing device to act as the signal processing means of either, or both, of the first or second aspects of the present invention.

According to a seventh aspect of the present invention there is provided a data storage device readable by a signal processing device carrying a set of instructions which, when executed upon the signal processing device, causes the signal processing device to execute a method according to the third aspect of the present invention.

According to an eighth aspect of the invention there is provided a machine readable medium containing instructions which when read onto a computer cause that computer to provide the system of the first aspect of the invention.

According to a ninth aspect of the invention there is provided a machine readable medium containing instructions which when read onto a computer cause that computer to provide the electronic signal processing apparatus of the second aspect of the invention.

According to a tenth aspect of the invention there is provided a machine readable medium containing instructions which when read by a computer cause that computer to perform the method of the third aspect of the invention.

According to an eleventh aspect of the invention there is provided a method of asset management comprising the steps of:
i) storing asset data relating to a plurality of assets upon a data storage means;
ii) processing the asset data so as to determine the usage of any one or more assets of at least one datacenter resource; and
iii) charging the owner/user of the asset for the asset depending upon the usage of the at least one datacenter resource.

Datacenter resources may comprise any one or more of the following: power supplied to the or each asset; the heat output by the or each asset (and/or the cooling required for the or each asset); a maintenance resource in order to service the or each asset; the physical space taken up by the asset (any one or more of height, width, length, volume).

According to a twelfth aspect of the invention there is provided a method of asset management of a datacenter comprising the steps of:
i) storing asset data relating to a plurality of assets upon a data storage means;
ii) associating disaster recovery data with the asset data for at least some of the managed assets; and
iii) in the event of a disaster automatically accessing the disaster recovery data and contacting individuals detailed within that data to address the disaster.

Such a method is advantageous because it can help to reduce the down time of assets managed by the method. The skilled person will appreciate that the longer an asset is out of use then the higher the costs associated therewith and the greater the inconvenience caused. It is therefore desirable to reduce the time that an asset is out of service as far as possible.

The machine readable medium of any of the preceding aspects of the invention may comprise any of the following: a floppy disk; a CD ROM/RAM; a DVD ROM/RAM (including +R/-R/+RW/-RW); a memory; a hard drive; any other form of storage; a transmitted signal; a wire; an Internet transfer and/or download (including ftp; http; https; and the like).

BRIEF DESCRIPTION OF THE DRAWINGS

The invention will now be described, by way of example only, with reference to the accompanying drawings, in which.

DETAILED DESCRIPTION

Figure 1:
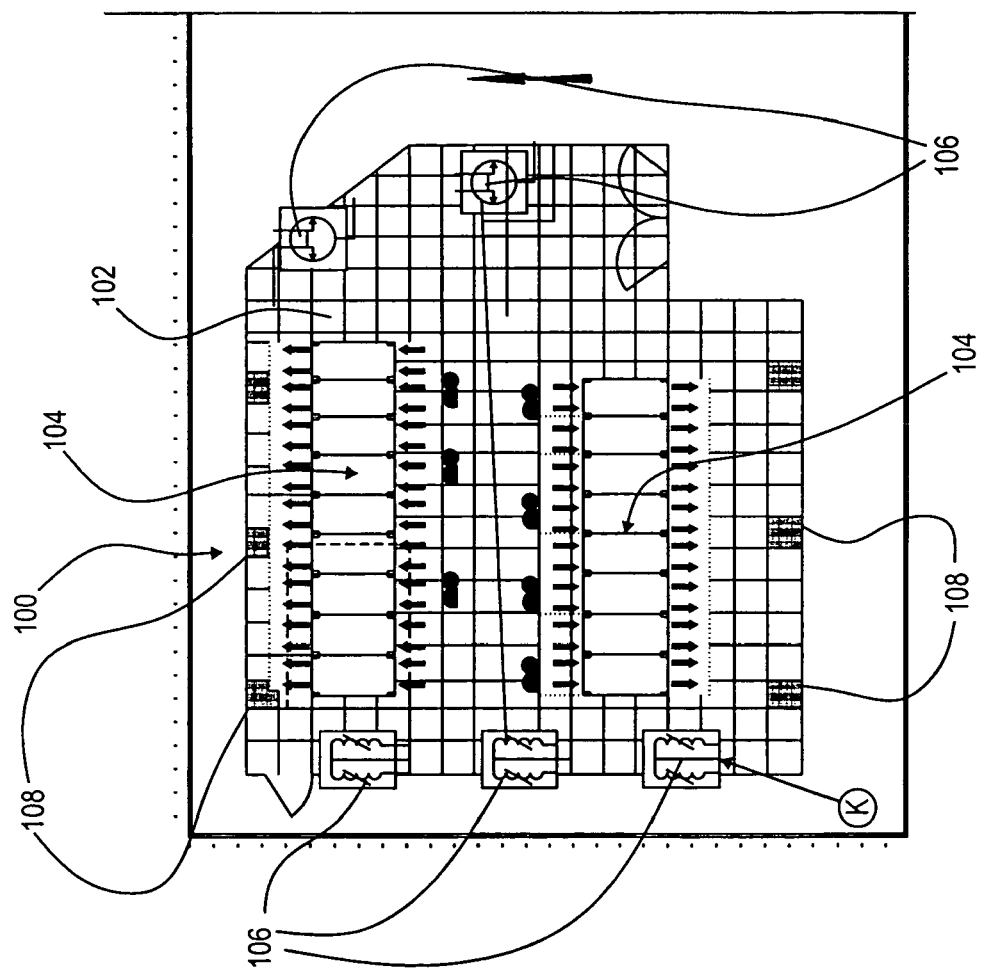
FIG. 1 is a schematic diagram of a datacenter incorporating an embodiment of an asset management system according to an aspect of the present invention.
Figure 1A:
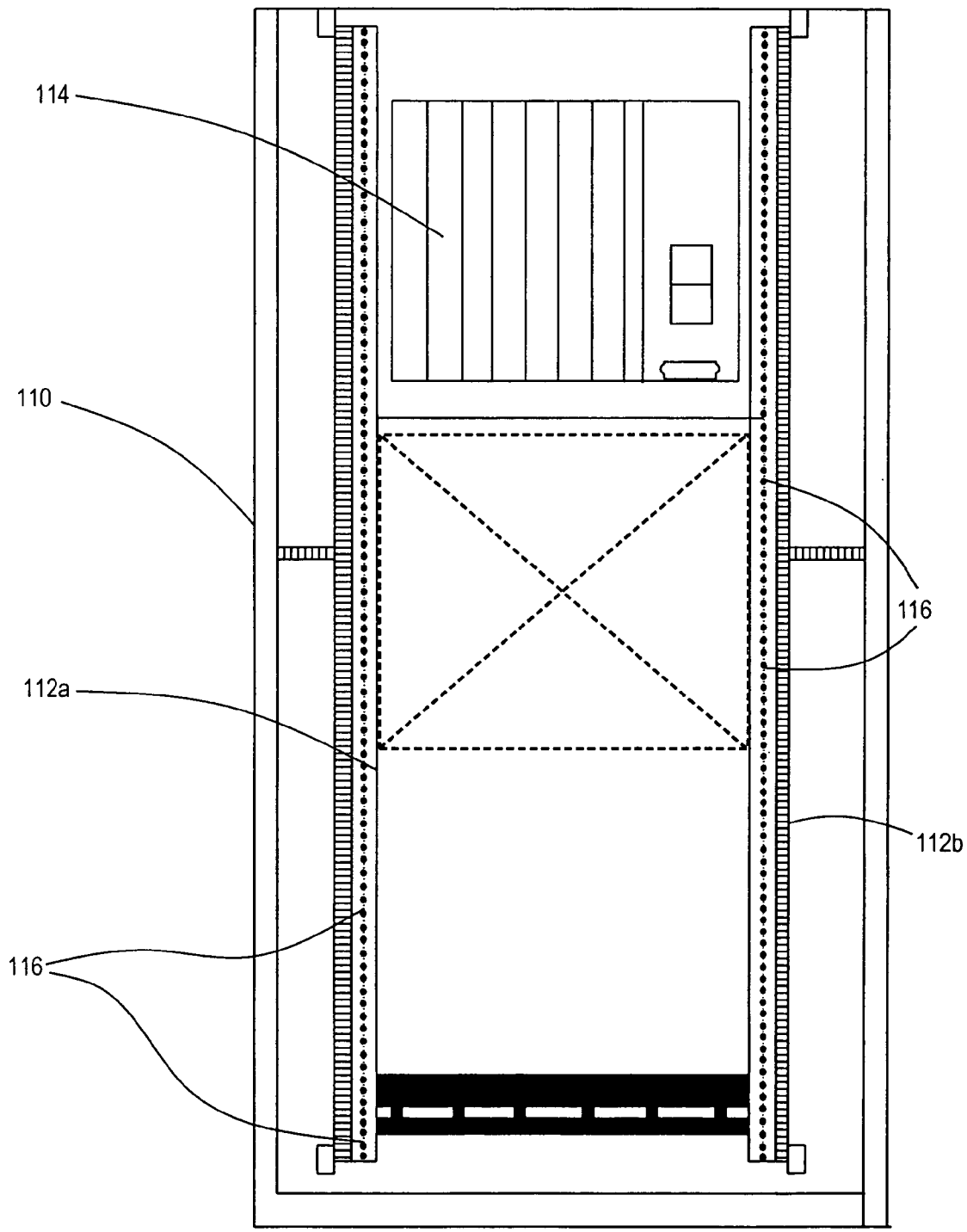
FIG. 1a is a representation of a cabinet of the datacenter of FIG. 1 containing an asset.

Referring now to FIGS. 1 and 1a a datacenter 100 comprises a floor area 102 having a plurality of equipment cabinets 104 distributed thereabout. The floor area 102 has power distribution units (PDU) 106 distributed close to the cabinets 104 for providing power to the cabinets 104, and vented floor tiles 108 for providing air conditioning to the datacenter 100.

Each cabinet 104 comprises a hollow outer shell 110 with parallel stanchions 112a,b mounted therein. The stanchions 112a,b are spaced such that a standard sized server 114, or other computing asset, can be mounted therebetween and have a plurality of tapped fixing holes 116 spaced along their height into which a nut or screw can located in order to fix the server 114 in position. It will be understood that alternate mountings can be used, for example placing an asset, e.g. the server 114 on a shelf located within the shell 110.

Figure 2:
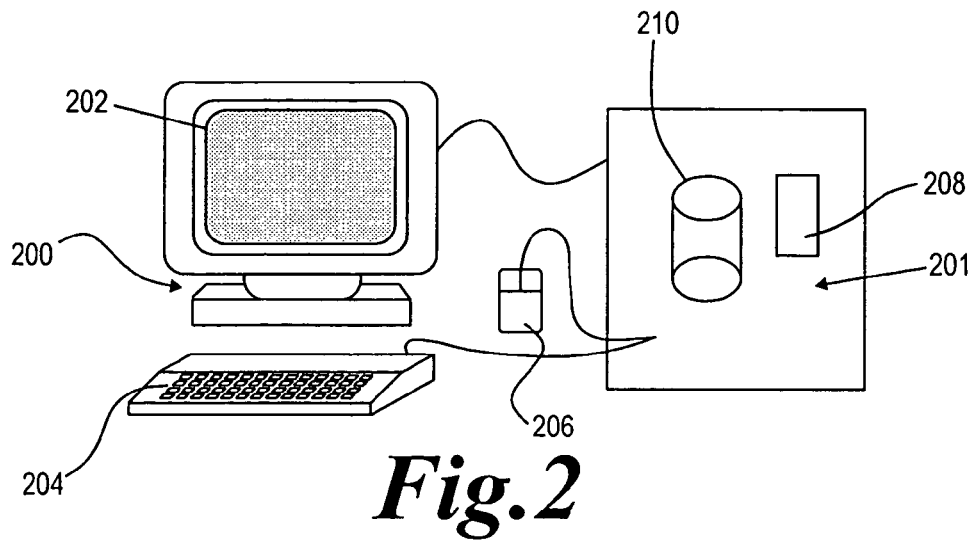
FIG. 2 is a schematic diagram of the embodiment of asset management system according to an aspect of the present invention used in the datacenter of FIG. 1.

Referring now to FIG. 2, an asset management system 200 comprises a processing unit 201, a visual display unit (VDU) 202, a keyboard 204 and a mouse 206. The processing unit 201 comprises a processor 208 and a data storage medium 210, such as a magnetic hard disc and/or a DVD. The storage medium 210 has details of the layout of the datacenter 100 thereupon and all assets, for example servers within the datacenter 100. The processor 208 processes the data stored upon the storage medium and the system 200 can display a Graphical User Interface (GUI) of the datacenter 100, typically identical to the representation of FIG. 1, upon the VDU 202. It will be appreciated that the processing unit 201 may be local to the VDU 202, as in a standard PC, or the processing unit 201 may be remote from the VDU 202, as in a server-client arrangement.

The view of the datacenter 100 output onto the VDU 202 allows any asset, e.g. a server, contained within the datacenter 100 to be zoomed in on and to have its attributes displays, typically via an asset allocation GUI as will be described hereinafter. The data storage medium 210 also retains parameters relating to each asset within the datacenter 100, for example height, power consumption, heat output, network connectivity requirements, which are used in the automatic allocation of cabinet space to a given asset, as described hereinafter. Thus, each asset displayed on the GUI of the datacenter 100 is linked to a record in a central database stored upon the storage medium. The contents of each cabinet can be displayed upon a cabinet GUI similar to the representation of the cabinet 104 shown in FIG. 1a. Thus, the database may provide an accurate and detailed equipment location mapping within a central database that allows additional relationships to be built such as heat thresholds in cabinets to be set and space used to be tracked.

As the skilled person will appreciate the asset management system 200 may be provided by a computer perhaps having an architecture know as the PC, originally based on the IBM specification, an APPLE computer, a RISC (Reduced Instruction Set Computer) or the like. At the time of writing such computers would have a processing means, i.e. a processing means, as exemplified by the Intel™ Pentium IV™, the AMD™ Athlon™, and typically running at roughly 2.0 to 3.0 GHz or by other processors such as the PowerPC™, Alpha™ running at other clock frequencies. Such computers typically run operating systems such as the Microsoft™ Windows™, OSX™, Linux, UNIX, HP-IX™, AIX™, or the like.

Figure 3:
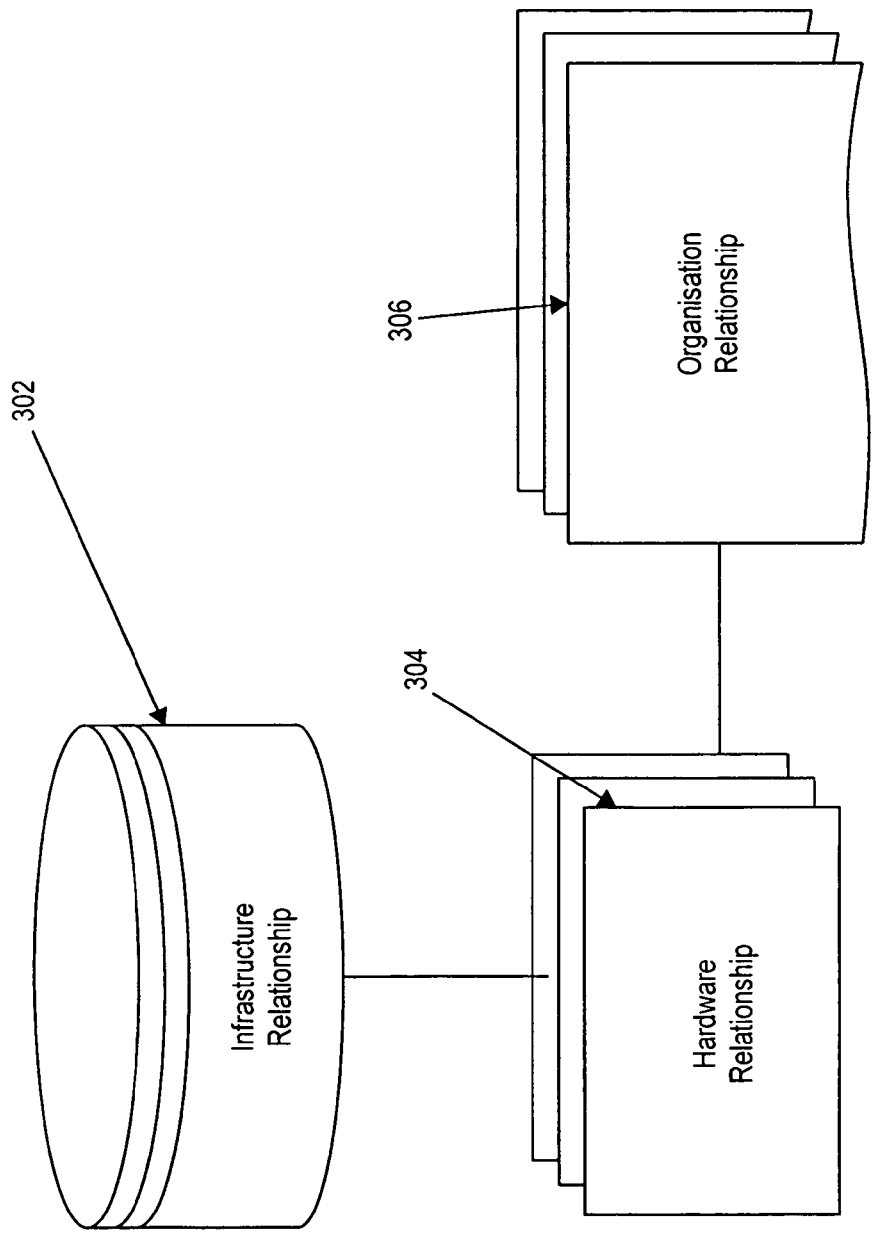
FIG. 3 is a representation of an asset tracking relationship used in the asset management system of FIG. 2.
Figure 4:
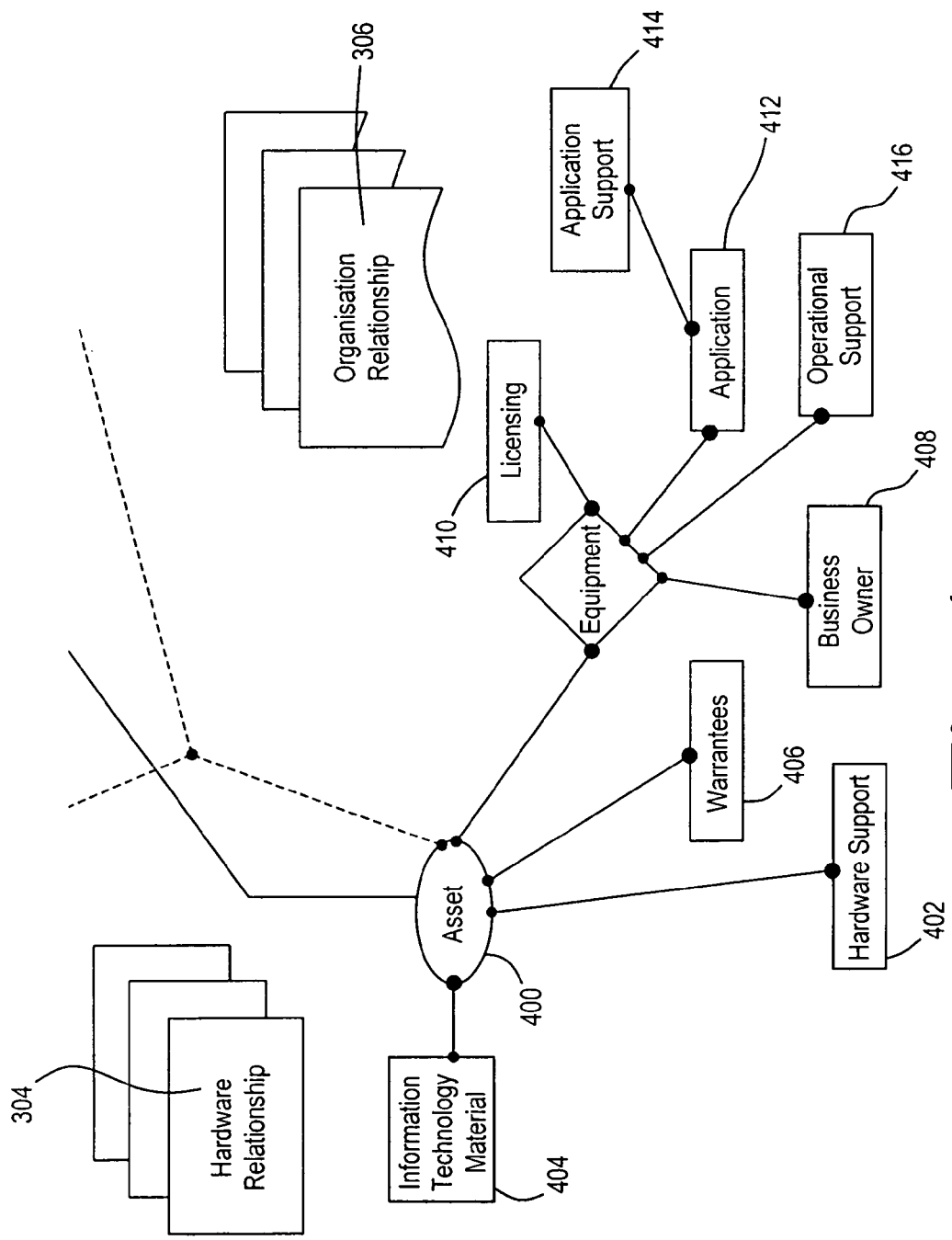
FIG. 4 is a representation of the attributes assigned to an asset within the asset management system of FIG. 2.
Figure 5:
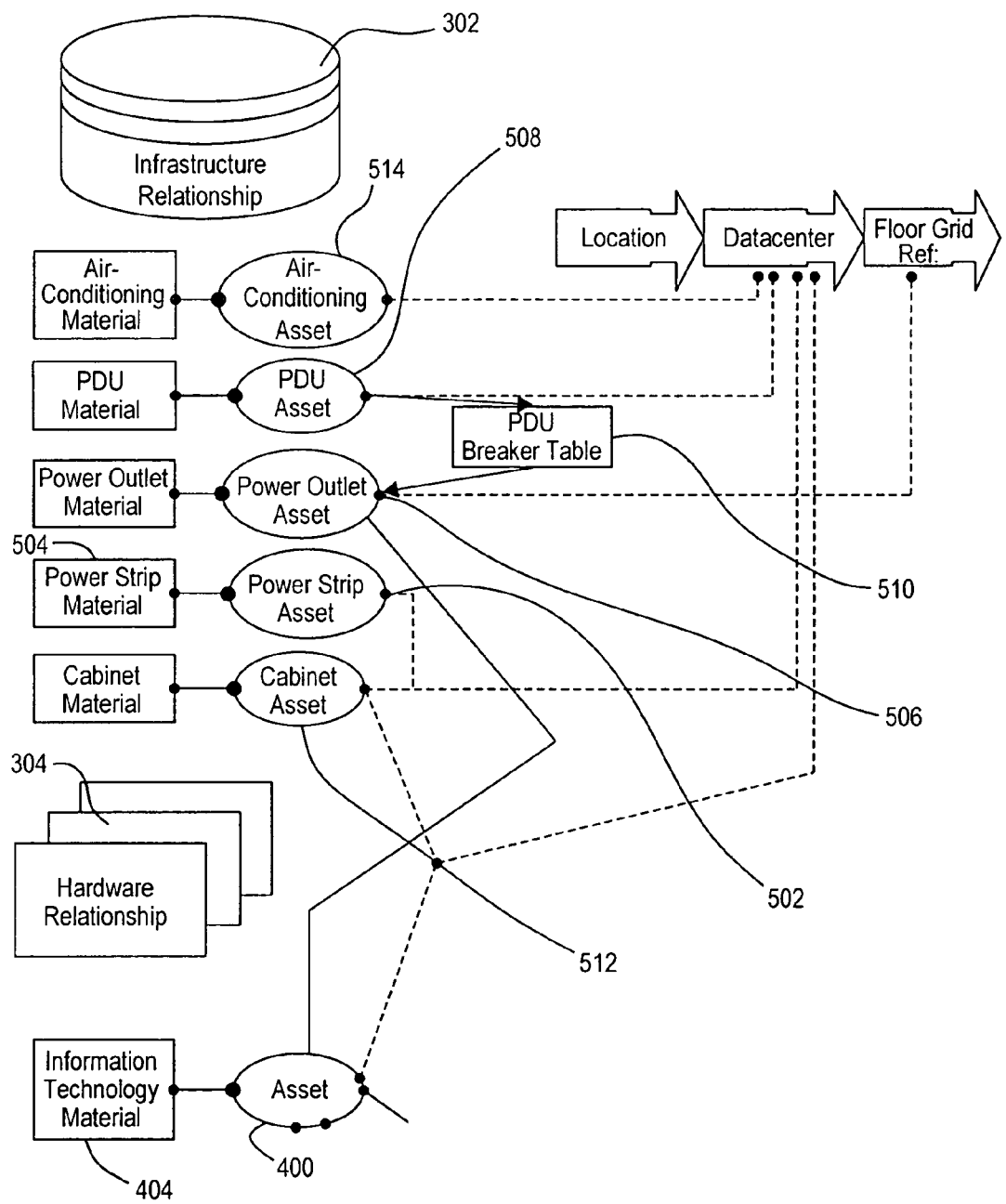
FIG. 5 is a representation of an interrelation between assets and organisational factors used in the asset management system of FIG. 2.

Referring now to FIGS. 3 to 5, due to the particular problems associated with datacenter management as detailed hereinbefore the present invention horizontally scales the relationships between infrastructure 302, hardware 304 and organisations 306. The infrastructure 302 details such parameters as nearest PDU, the number and type of network connections available to each cabinet and also the air conditioning settings to achieve good asset performance across the whole datacenter. The hardware 304 relates to the size of the asset and the power usage and heat output of an asset. Organisational information, as represented by the organisations 306, deals with the factors such as which organisation, i.e. which client of the datacenter operates which assets, and which personnel, both internally of the datacenter and externally at the datacenter's client company, are responsible for data and assets. By scaling these three relationships horizontally, through a hardware asset record 400 as a nominal hub, interactions between all three relationships and their effect on the running of the data centre can be accounted for and monitored to form an audit trail for each asset. Thus allowing the asset record 400 to track back dependencies through the infrastructure and identify problems such as, for example a major power failure.

The hardware asset record 400 stores variable information relating to the physical asset, for example IP address and memory capacity of the asset.

As described hereinbefore each asset, typically a server, is allocated a number of parameters and information relating to the asset is entered into the database. The asset record 400 is allocated details of hardware support 402 that is necessary to ensure the continued operation of the asset record 400, the information technology material 404, which details what the physical asset is e.g. a SUN E4000 having 4 processors and is 800 mm wide, and any warranties 406 associated with the asset record 400, these three sets of information come, for the most part under the auspices of the hardware relationship 304. Such interrelationships provide efficiencies by dynamic linking of the records such that an update to one record is reflected in any related records by a dynamic updating.

Typical factors that come under the auspices of the organisation relationship 306 include who the business owner 408 is, any software license 410 that is required for software running on the asset record 400, what application 412 is running on the asset record 400 and what application support 414 is required. The operational support 416 in terms of human support and other non-infrastructure support is also typically classed as an organisation relationship.

The asset record 400 must be linked to a number of infrastructure 302 considerations for placement in a cabinet of a datacenter. As shown in FIG. 5 the asset record 400 is linked to a power strip asset 502, which is logically linked to power strip material 504. The power strip asset 502 is itself linked to a power outlet asset 506. The power outlet asset 506 is linked to a PDU asset 508 via a PDU breaker table 510. Thus, the asset record 400 is logically linked to the PDU asset 508 via a logical, traceable chain of relationships. As can be seen from FIG. 5 the asset record 400 is also linked to a cabinet asset 512 which details which cabinet the asset record 400 is located in. Also, which air conditioning asset 514 is associated with the datacenter is also detailed, this is important as an air conditioning asset 514 may be overloaded if too many assets are located proximate to it. A link exists between the air conditioning asset 514 and the physical asset detailed in the asset record 400 via the datacenter-asset relationship and the datacenter-air conditioning asset relationship.

Figure 6:
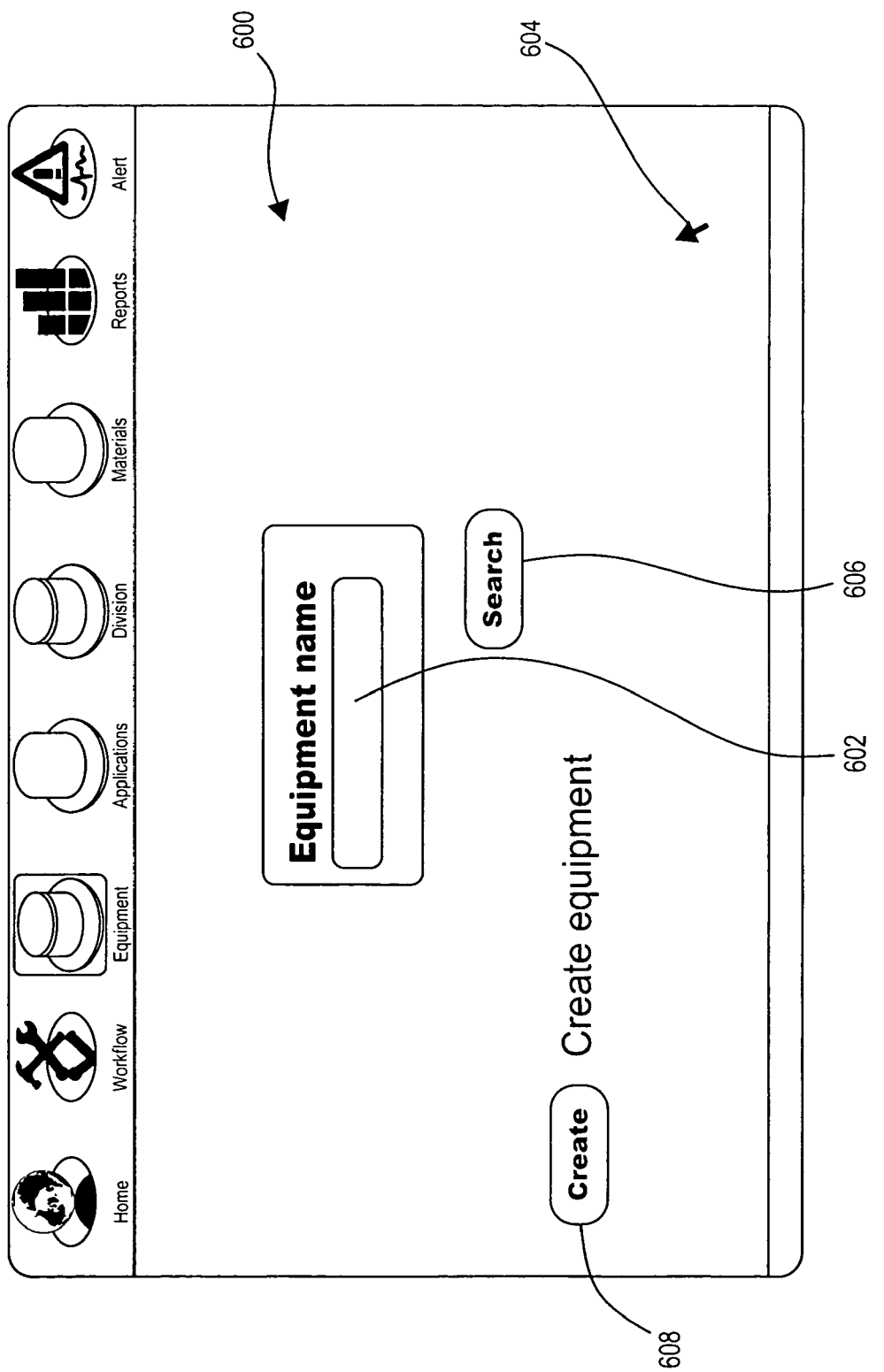
FIG. 6 is representation of an asset creation graphical user interface (GUI) associated with the asset management system of FIG. 2.

Referring now to FIG. 6, with reference to FIG. 2, an asset creation GUI 600 comprises a data entry field 602 where a user enters the name of an asset which has been arbitrarily assigned to that asset, for example CP10640PDNY for a particular server, via the keyboard of the system 200. The user then positions a cursor 604 over a search button 606 and clicks a button of the mouse, or other pointer controlling device, to find the asset in the database stored upon the storage medium 210. If the asset is not found in the database the user has the option to create an asset by moving the cursor 604 over a create button 608 and clicking the mouse. This allows the user to enter the specifications of an unlisted asset, thereby populating the database for that asset and thus enter it on to the database contained in the storage medium 210.

Figure 7:
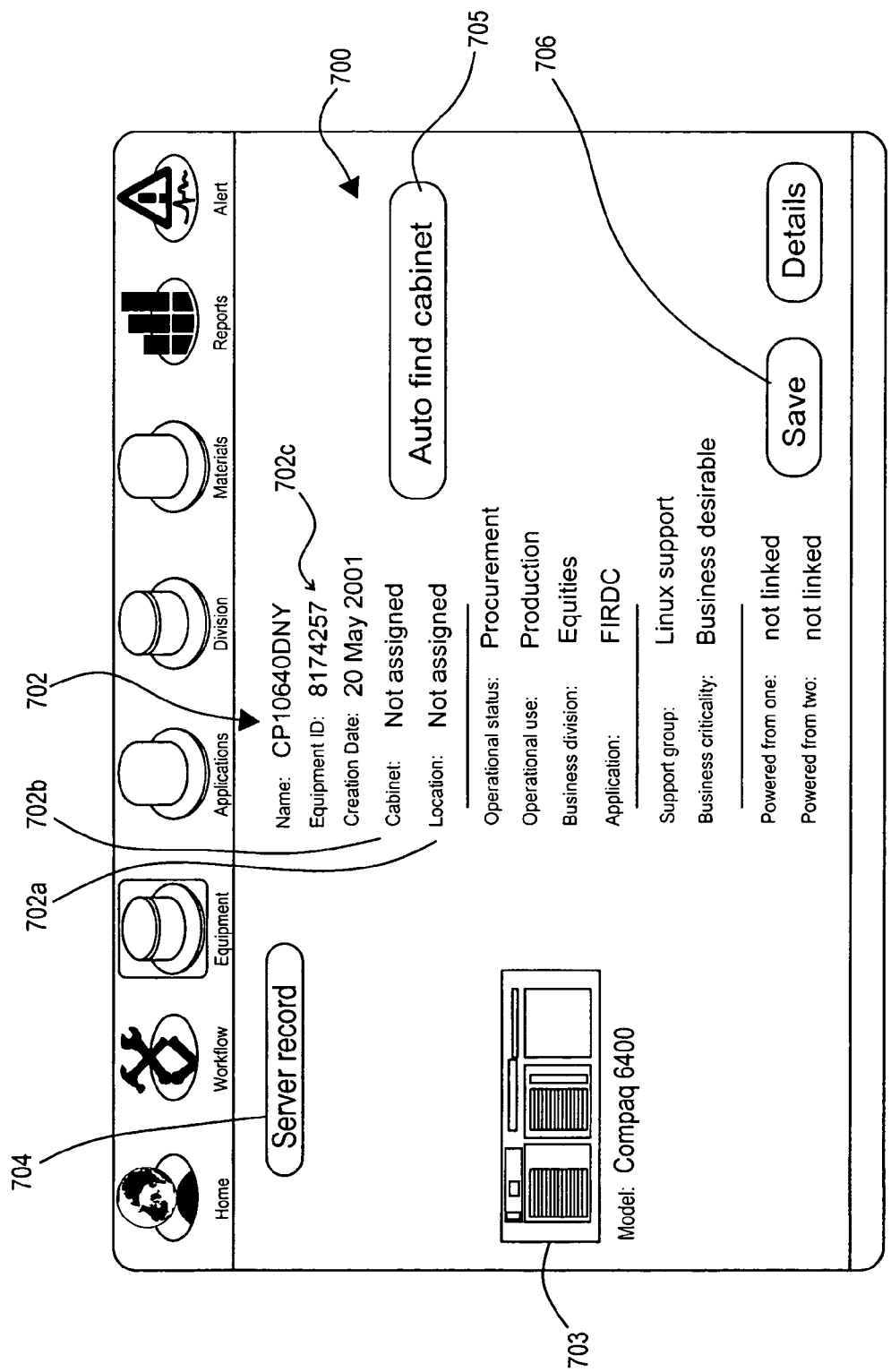
FIG. 7 is a representation of an asset allocation GUI associated with the asset management system of FIG. 2.

Referring now to FIG. 7, with reference to FIGS. 1 to 2, an asset allocation GUI 700 comprises a number of display fields 702 that show details of a number of parameters and the status of an asset and a pictorial representation 703 of the asset.

Of particular importance are the location field 702a which displays which datacenter the asset is located at, or is to be located at. The cabinet field 702b displays which cabinet 104 the asset is located within, and the equipment ID field 702c uniquely identifies the actual piece of equipment that constitutes the asset. It will be appreciated that a single asset management system 200 can control the assets at a plurality of datacenters, The remaining fields relate to such information as the creation date of the record in the database, the operational status of the asset, e.g. in procurement, operational or offline, the operational use of the asset, which business division is operating the asset, what application is being run on the asset the datacenter support group responsible for maintaining the asset, the business criticality of the asset and two possible PDU connections.

It is possible to display a usage history of the asset by placing a cursor over a server record button 704 and clicking the mouse button. Such a usage history will include any changes made to the asset record 400, for example at a change in location, related to any field value stored in a record or IP address.

It is usual for the location of the datacenter 100 to be assigned by a user of the system 200. The system 200 is arranged to automatically find the optimum cabinet location within the user specified datacenter 100 for any given asset by the user clicking with the mouse having the cursor over an auto-find cabinet button 705. This is achieved by carrying out a comparison of a number of parameters, for example the height of the asset, the heat output of the asset, the power requirement of the asset and the network connectivity requirements of the asset to the available cabinet space, air conditioning characteristics, PDU distribution and network connections respectively available in the datacenter 100. Some parameters may exclude a cabinet from consideration in allocating space. For example if there were not enough space remaining for the asset, the mounting type of the cabinet were inappropriate for the asset, there were not enough heat capacity within the cabinet for the asset, or similar reasons.

Each of the remaining parameters is compared and a weighted score is calculated and the cabinet space with the lowest weighted score is the optimum available cabinet space. For example cabinets whose heat capacities would allow the asset to be installed therein may be weighted with the cabinet having the highest remaining heat capacity would be the most favourable based upon the heat capacity parameter. The weighting of the parameters in the comparison can vary between datacenters, or indeed within a datacenter on the nature of the asset to which cabinet space is being assigned dependent upon the particular concerns of the datacenter manger at any given time.

When an asset is ready for allocation to a cabinet, the invention allows for both the manual and automatic allocation of the asset to a cabinet. For manual allocation of the asset, the invention searches for the best space based on a number of specified criteria. In a preferred version of the invention, the tool calculates the space required for all equipment relating to the install by calculating the total heat output and uses this information with the subnet and location information specified to return the best four cabinets for the installation. The best cabinet is chosen automatically when the equipment is to automatically allocate itself, otherwise the best cabinets are displayed and one can be selected manually.

Some embodiments of the invention balance the datacenter based on the heat output in cabinets across the room. The equipment may be allocated to the cabinet with the least heat output to balance the datacenter's heat output.

In a preferred form of the invention, assets are automatically placed into the cabinet. The invention used the stored values of the dimensions of the free space in the cabinet to automatically assign a record to the correct position in a cabinet. Each asset stores the physical dimensions it possesses and the overall size of all equipment involved in the installation.

The order in which the assets are allocated a position on the cabinet is defined by the relative 'superiority number' stored against the asset. The 'superiority number' defines which asset is installed first and the order in which the other assets are installed.

Instead of simply presenting the user with a single 'optimum' cabinet into which the asset is to be fitted the system may display a number of alternative cabinets to the user for the user to make a final decision regarding which cabinet is the most appropriate cabinet into which to place the asset, typically by selecting a cabinet from a list or graphical representation of cabinets.

Once an asset has been allocated to a cabinet and the user is satisfied with the allocation the user places a cursor over a save button 706 and clicks the mouse This saves the information on the VDU 202 to the database upon the data storage medium 210 and thereby updates an asset usage history which acts as an audit trail and which is accessible via the details button 704.

Figure 8:
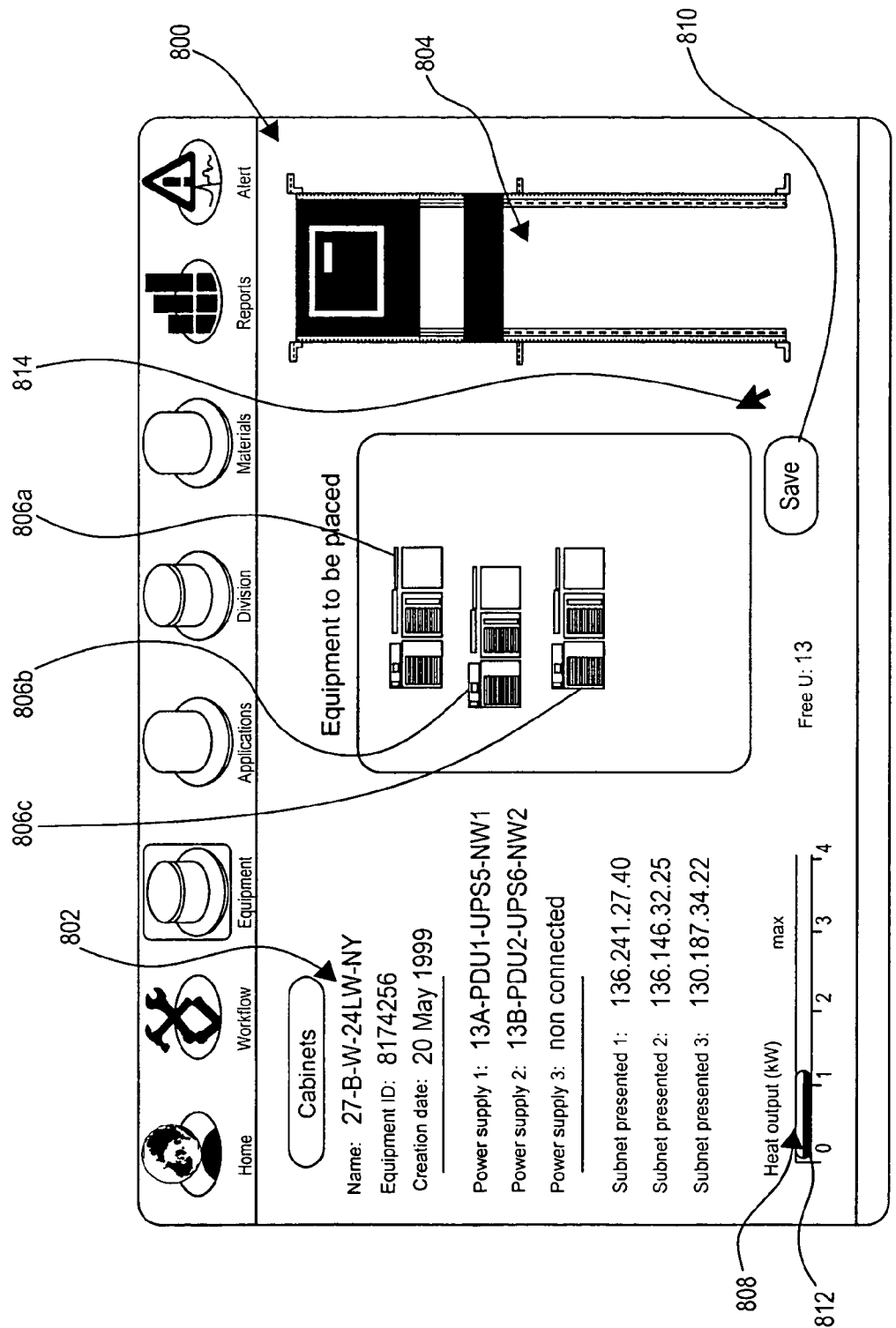
FIG. 8 is a representation of a cabinet GUI associated with the asset management system of FIG. 2.

Referring now to FIG. 8, with reference to FIGS. 1 to 2, a cabinet GUI 800 comprises a number of display fields 802, a graphical representation of a cabinet 804 to which assets have been allocated, graphical representations of allocated assets 806a-c, a heat output indicator 808, and a save button 810.

The display fields 802 relate to the cabinet name, an identifier associated with the cabinet, a creation date for the entry in the database stored on the data storage medium 210, identifiers for three possible PDU connections and identifiers for three possible network connections.

The heat output indicator 808 displays the sum of the heat outputs of the assets that are located in the cabinet displayed as the representation 804 in the form of a graduated bar 812 with a maximum heat output noted on the bar 812.

A user can 'click and drag' any of the representations of the assets 806*a-c* onto the representation of the cabinet 804 using a cursor 814 in order to obtain a view of the cabinet as it will be in use. The value on the heat output indicator 808 varies as each representation of an asset 806*a-c* in added to, or removed from, the representation of the cabinet 804.

Once the user is satisfied with the layout displayed upon the GUI 800 the cursor 814 can be moved over the save button and the mouse clicked in order to enter the details of the layout of the represented assets 806*a-c* within the represented cabinet 802 into the database held on the storage medium of the system 100.

Figure 9:
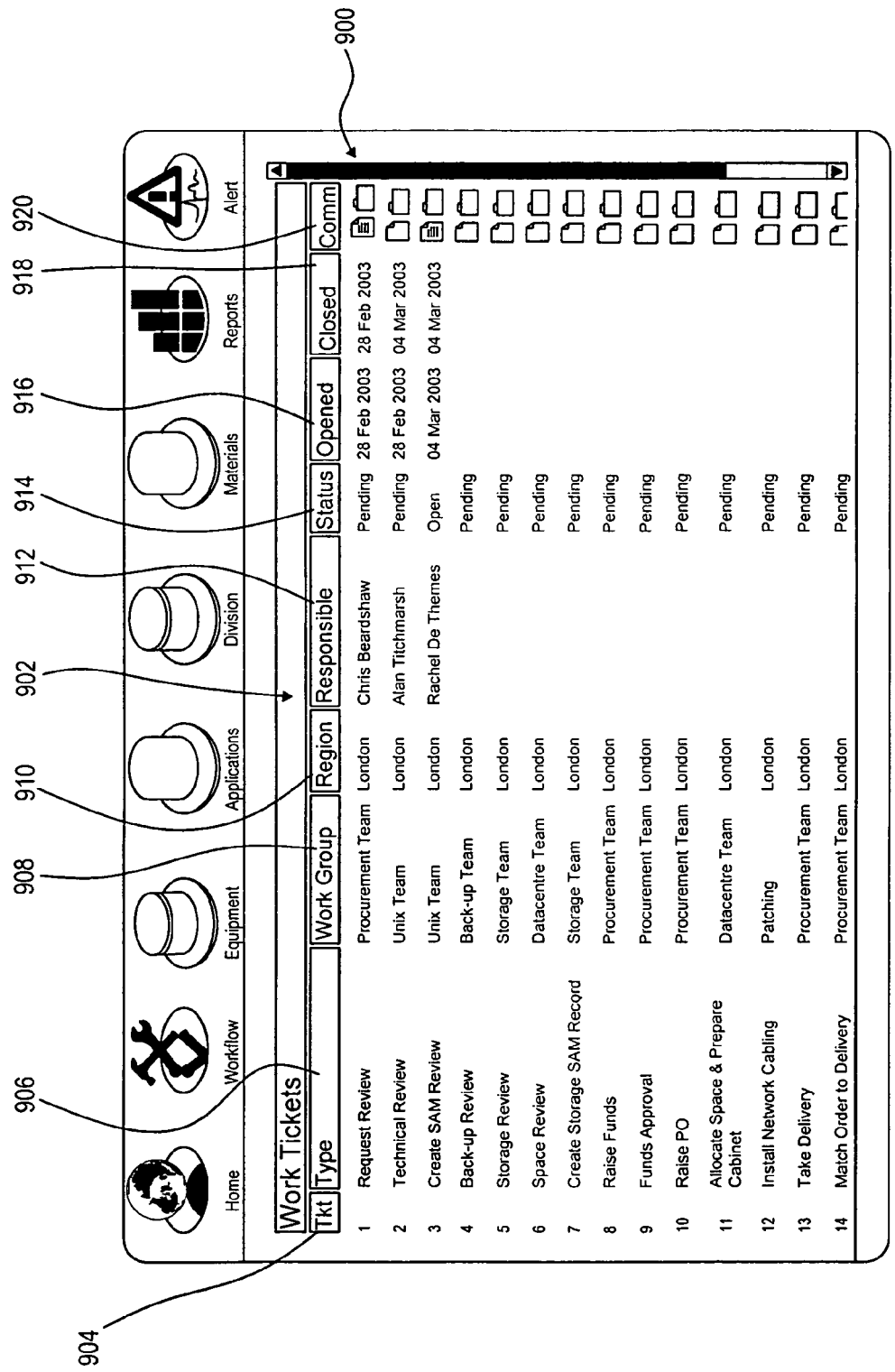
FIG. 9 is a representation of a workflow GUI associated with the asset management system of FIG. 2.

Referring now to FIG. 9, a workflow GUI 900 comprises a table 902 having entries relating to work ticket numbers 904, work type 906, work group 908, region 910, responsible person 912, status of the work 914, date the ticket was opened 916, date the ticket was closed 918 and a comment field 920.

The workflow GUI 900 allows the progress of a process, in this instance the procurement of an asset, to be tracked, each consecutive step of the process has an incrementing ticket number assigned to it along with a description of the work to be undertaken, the work type 906. Further noted are the work group 908 responsible for carrying out the work, the region 910 where the work group 908 is based, and the person within the work group 908 who is ultimately responsible 912 for overseeing the work. The current status 914 of the work changes when a ticket 902 is on the date when the ticket 902 is opened 916 and again when on the date when the ticket 902 is closed 918. The ticket 902 can be viewed and changed by any person in the work group 908. The comment field 920 can be opened and comments made about the work, for example regarding problems or delays that may adversely affect tickets 902 further down the sequence of operations in the work.

Figure 10:
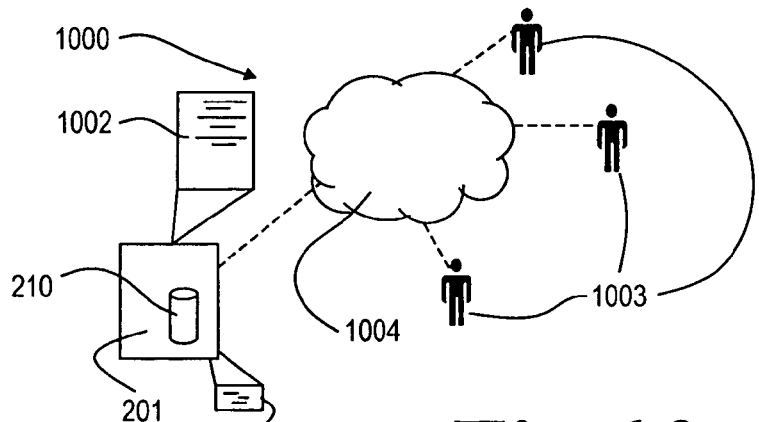
FIG. 10 is a schematic representation of a data recovery process enabled by the system of FIG. 2.

Referring now to FIG. 10, with reference to FIGS. 1 to 2*a*, a disaster recovery scheme 1000 is implemented upon the processing unit 201 receiving notification of a failure of a datacenter system, for example air-conditioning, a PDU or a network connection, or of an asset, for example a server, either automatically via a sensor or manually from a user input at a keyboard. The recovery scheme 1000 involves the processing unit 201 accessing recovery data 1002 from the data storage medium 210. The recovery data 1002 accessed is dependent upon what system or asset has failed. The recovery data 1002 will typically include details of support personnel 1003 and managers who require contacting in the event of the particular system, or asset failing. The processing unit 201 is connected to a network 1004, typically a cellular telecommunications network and, or, a data network such as the Internet, and issues notifications to support personnel 1003 via the network 1004, for example via SMS, MMS, telephone call, facsimile, or e-mail. If required the processing unit 201 can be configured to initiate a conference call between the support personnel 1003 via the network 1004.

The processing unit 201 generates a record 1006 of the time and nature of the failure, and also which system, or asset, was affected and how the processing unit was notified of the failure, i.e. human notification or if a sensor which sensor. This record 1006 is stored on the data storage medium 210 for future reference and audit purposes.

Figure 11:
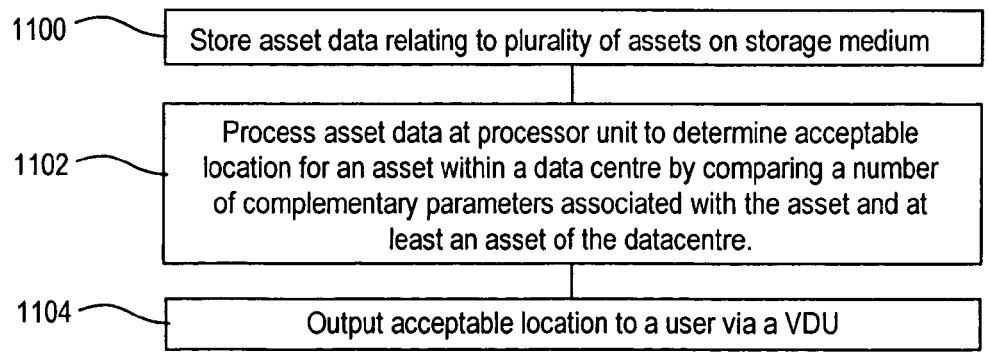
FIG. 11 is a method of asset management according to an aspect of the present invention.

Referring now to FIG. 11, a method of asset management comprises storing asset data relating to a plurality of assets upon a data storage medium (Step 1100). The asset data is processed at a processor unit so as to determine an acceptable location for an asset within a datacenter based upon a comparison of a number complementary parameters associated with the asset and at least an element of the datacenter (Step 1102). The acceptable location is output to a user of the system via a VDU (Step 1104).

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents, but also equivalent structures.

What is claimed is:

1. A system comprising an asset optimization system that includes:
    a data storage arranged to store data including server data relating to a plurality of servers, and datacenter data that includes a list of cabinets within a datacenter into which each of the servers is physically locatable;
    a hardware processor arranged to process data and generate an output, the processor being configured to:
        compare at least one server parameter associated with one of the servers and at least one cabinet of the datacenter; and
        determine a physical location for each of the servers within the cabinets of the datacenter according to the comparison, the determined physical location being chosen to optimize performance and management of the server and/or the servers within the datacenter; and
    a display arranged to display the output, the display being arranged to display the determined physical location to a user of the system.

2. A system according to claim 1 comprising input structure arranged to receive a user input accepting a suggested location for one of said plurality of servers.

3. A system according to claim 1 wherein the processor is capable of allocating locations to a server and of updating server data, and wherein the processor is arranged to allocate a location to a server and to update the server data each time one of said servers is allocated to a location within the datacenter.

4. A system according to claim 1 wherein the server data for each of said servers forms an audit trail for that server.

5. A system according to claim 1 wherein the server parameters include at least one of the following: height of server, power consumption, heat dissipation, number of network connections, type of network connectivity, and reliability.

6. A system according to claim 1 wherein the at least one cabinet of the datacenter includes at least one of the following: available space, power supply availability, ability to dissipate heat, number of network connections, type of network connections, and required reliability.

7. A system according to claim 1 wherein the data storage is arranged to store workflow data indicative of a series of operations to be carried out in relation to at least one of the servers and the processor is arranged to process the workflow data.

8. A system according to claim 7 wherein the output of the processor includes a critical path of operations generated from the workflow data.

9. A system according to claim 8 wherein the processor is capable of opening operations from said workflow data and is arranged to open a second operation in the critical path once a first operation has been closed.

10. A system according to claim 7 wherein the processor is capable of receiving data from a user input, associating that data with workflow data and storing that data in association with the workflow data, and in which the processor is arranged to receive comment data associated with an operation from a user input and to store the comment data in association with the workflow data for said operation.

11. A system according to claim 1 wherein the processor is capable of accessing data from one of the data storage and a further data storage and in which the processor accesses recovery data from the one of the data storage and the further data storage in response to an input that a failure of at least one of the system, and one of said servers, of the datacenter has occurred.

12. A system according to claim 11 wherein, in the event of a failure, the processor is arranged to generate an output that includes at least one message to be issued to the people listed in the recovery data in the form of at least one of the following: e-mail, short messaging service (SMS), multimedia messaging service (MMS), and any other suitable format.

13. A system according to claim 11 wherein the processor is capable of initiating a conference call and in which the processor is arranged to initiate a conference call between people listed in the recovery data.

14. A system according to claim 11 wherein the processor is arranged to generate an output that includes report data relating to at least one of the following: nature of the failure, identity of the system, or server, subject to the failure, and details of communications sent to people named in the recovery data.

15. A system according to claim 1 wherein the display is capable of displaying graphic data and is arranged to display a graphical user interface (GUI) representation of the datacenter which identifies at least one of each of said cabinets and said servers within the datacenter.

16. A system according to claim 15 wherein the display is arranged to output a graphical user interface (GUI) representation of either, or both, of the cabinet of the datacenter and the server, either, or both of which, can be manipulated about the display by means of a 'click and drag' of a mouse by a user.

17. A system according to claim 1 wherein one or more of the data storage, the processor and the display is remote from the other(s).

18. A system according to claim 1 wherein one of the cabinets includes at least one mounting.

19. A system according to claim 1 wherein each of the cabinets includes at least one mounting.

20. A system according to claim 1 wherein the processor is capable of arranging servers and is arranged to automatically arrange servers within the datacenter according to its processing of the server data.

21. A method comprising managing assets in a manner that includes:
providing a data storage for storing data;
storing in the data storage server data relating to a plurality of servers, and datacenter data that includes a list of cabinets within a datacenter into which each of the servers is physically locatable;
providing a hardware processor for processing data;
comparing, by the processor, at least one server parameter associated with one of the servers and at least one cabinet of the datacenter;
determining, by the processor, a physical location for each of the servers within cabinets of the datacenter according to the comparison, the determined physical location being chosen to optimize performance and management of the server and/or the servers within the datacenter;
providing a display for outputting data; and
displaying the determined physical location to a user of the system via the display.

22. The method of claim 21 comprising providing a data input structure capable of receiving inputs and inputting via the data input structure user acceptance of a suggested location for the server.

23. The method of claim 21 comprising updating the server data each time an server is allocated to a location within the datacenter.

24. The method of claim 21 comprising forming an audit trail for an server from the server data for said server.

25. The method of claim 21 wherein the comparing is carried out using at least one of the following parameters as the at least one server parameter: height of server, power consumption, heat dissipation, number and/or type of network connectivity, and reliability.

26. The method of claim 21 wherein the comparing is carried out using at least one of the following parameters of the cabinet: available space, power supply availability, ability to dissipate heat, number and/or type of network connections, and required reliability.

27. The method of claim 21 wherein the processor is capable of forming workflow data, and including using the processor to form workflow data indicative of a series of operations to be carried out in relation to at least one of the servers.

28. The method of claim 27 wherein the processor is capable of defining a critical path of operations, and including using the processor to define a critical path from the operations.

29. The method of claim 28 wherein the processor is capable of opening an operation, and including using the processor to open a second operation in the critical path once a first operation has been closed.

30. The method of claim 27 including providing an input structure capable of receiving data, and receiving comment data associated with an operation from the input structure and storing the comment data in association with the workflow data for said operation.

31. The method of claim 21 comprising storing recovery data on the one of the data storage and further data storage, and accessing recovery data from the one of the data storage and further data storage in response to an indication via the processor that a failure has occurred.

32. The method of claim 31 comprising providing a message generator, and using the message generator to generate messages to be issued to people listed in the recovery data in the form of at least one of the following: e-mail, short messaging service (SMS), multimedia messaging service (MMS), and any other suitable format.

33. The method of claim 31 comprising providing conference call structure that can initiate a conference call, and using the conference call structure to initiate a conference call between people listed in the recovery data.

34. The method of claim 31 comprising providing a report generator, and using the report generator to generate report data relating to at least one of the following: nature of the failure, identity of the system, or server, subject to the failure, and details of communications sent to people named in the recovery data.

35. The method of claim 21 comprising configuring one of the cabinets to include at least one mounting.

36. The method of claim 21 comprising configuring each of the cabinets to include at least one mounting.

37. The method of claim 21 comprising outputting a graphical user interface (GUI) representation of the datacenter at the display and identifying each cabinet and/or server within the datacenter.

38. The method of claim 21 comprising outputting a graphical user interface (GUI) representation of either, or both, of the cabinet of the datacenter and the server, either, or both of which can be manipulated about the display by a 'click and drag' of a mouse by a user.

39. A datacenter having servers managed to implement the method of claim 21, the servers comprising at least one hardware processor.

40. A data storage device readable by a hardware signal processing device carrying a set of instructions which, when executed upon the signal processing device, causes the signal processing device to execute the method of claim 21, the data storage device comprising at least one hardware processor.

* * * * *

UNITED STATES PATENT AND TRADEMARK OFFICE
Certificate

Patent No. 7,765,286 B2                                                                        Patented: July 27, 2010

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Robert Benjamin Fortington-Neave, London (UK); and Lee James Moreton, Walnut, CA (US).

Signed and Sealed this Twenty-fifth Day of December 2012.

*JOSEPH E. AVELLINO*
*Supervisory Patent Examiner*
*Art Unit 2454*
*Technology Center 2400*